United States Patent [19]

Matsuda

[11] Patent Number: 4,530,005
[45] Date of Patent: Jul. 16, 1985

[54] AFC CIRCUIT FOR TELEVISION TUNER

[75] Inventor: Khoichi Matsuda, Tokyo, Japan

[73] Assignee: Pioneer Electronic Corporation, Tokyo, Japan

[21] Appl. No.: 389,356

[22] Filed: Jun. 17, 1982

[30] Foreign Application Priority Data

Jun. 18, 1981 [JP] Japan .................................. 56-94446

[51] Int. Cl.³ ............................................ H04N 9/535
[52] U.S. Cl. ................................................ 358/21 R
[58] Field of Search ......................... 358/21 R, 195.1; 455/192, 260, 265

[56] References Cited

U.S. PATENT DOCUMENTS 3,020,339 2/1962 Richman ........................... 358/21 R
3,678,183 7/1972 Montgomery .................... 358/195.1

Primary Examiner—Richard Murray
Attorney, Agent, or Firm—Sughrue, Mion, Zinn, Macpeak & Seas

[57] ABSTRACT

An AFC circuit for use in a television tuner includes a mislocking prevention device for shifting the AFC voltage toward the audio carrier when the power switch is turned on or the channel is changed, so that the color carrier will not be inadvertently locked.

7 Claims, 5 Drawing Figures

AFC CIRCUIT FOR TELEVISION TUNER

BACKGROUND OF THE INVENTION

This invention relates to AFC (automatic frequency control) circuits in TV (televison) tuners, and more particularly to an AFC circuit in a color TV tuner, which performs AFC with an audio carrier signal.

An AFC circuit in a color TV tuner and especially in an audio tuner employs an audio carrier signal to effect automatic frequency control in view of the S/N ratio and the manufacturing cost. That is, a detection output according to the amount of detuning of the received signal frequency is employed as the AFC voltage, which is applied to the vari-cap in the local oscillating circuit, to achieve automatic frequency control.

Immediately after the power switch is turned on or when the channel is changed, the local oscillating frequency is unstable. Accordingly, sometimes the received signal frequency is shifted by several hundred KHz to 1 MHz from the tuning point, and is thereafter returned to the tuning point by the operation of the AFC circuit. In this connection, it should be noted that the difference in frequency between the audio carrier and the color carrier is only 920 KHz. Therefore, if the tuning is shifted by about 500 KHz or more towards the color carrier when the power switch is turned on or when the channel is changed, the AFC will be applied to the color carrier; that is, so-called "mislocking" takes place, thus interrupting correct signal reception.

SUMMARY OF THE INVENTION

Accordingly, an object of this invention is to provide an AFC circuit for a TV tuner, in which the occurrence of mislocking of the AFC when the power switch is turned on or when a channel is changed is prevented.

The AFC circuit for a TV tuner according to the invention is designed so that, when tuning is shifted towards a color carrier when the power switch is turned on or when a channel is changed, the AFC voltage is shifted in level so that tuning is shifted towards the audio carrier.

BRIEF DESCRIPTION OF THE DRAWINGS

One embodiment of this invention will be described with reference to the accompanying drawings, in which.

DETAILED DESCRIPTION OF THE PREFERRED EMBODIMENTS

Figure 1:
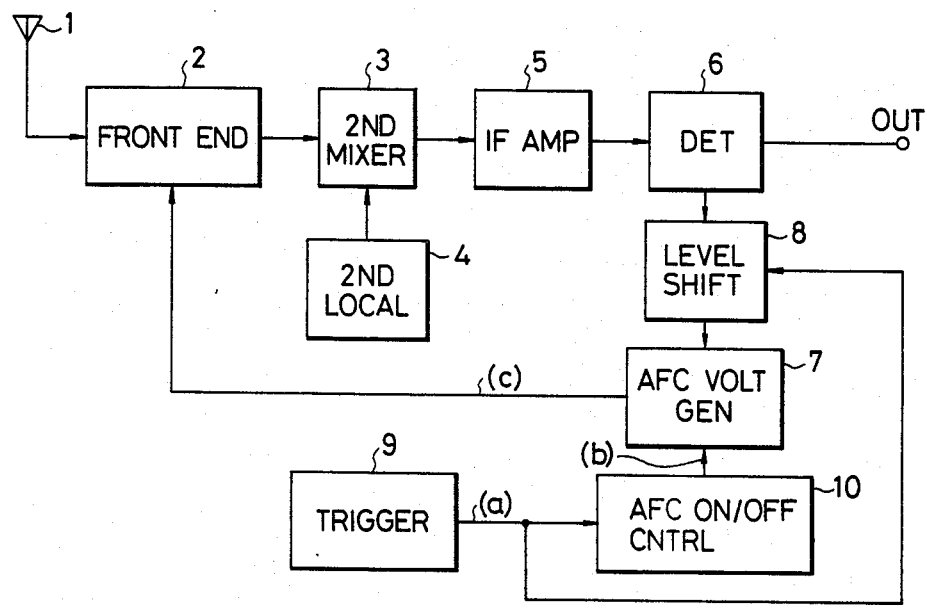
FIG. 1 is a block diagram showing one example of an AFC circuit according to this invention.

FIG. 1 is a block diagram showing one example of an AFC circuit in a television tuner according to the invention. A signal received through an antenna 1 is applied to a front end circuit 2, where it is subjected to station selection as required and is then converted into a first audio IF (intermediate frequency) signal of 54.25 MHz. The first audio IF signal is applied to a second-mixer circuit, where it is mixed with a local oscillating signal of 64.95 or 43.55 MHz from a second local oscillator 4, as a result of which a second audio IF signal of 10.7 MHz is output by mixer 3. Setting the frequency of the second audio IF signal of 10.7 MHz is suitable for an existing stereophonic device. The second audio IF signal is amplified by an IF amplifier 5 and is subjected to FM demodulation in a detector circuit 6, as a result of which it is outputted as an audio signal. The detector circuit 6 provides a detection output according to a so-called "S" curve characteristic in response to the amount of received signal frequency detuning. The detection output is applied through a level shifting circuit 8 to an AFC voltage generating circuit 7.

The level shifting circuit 8 operates to upwardly shift (in the case where the audio carrier is higher than the color carrier) the AFC voltage level by a predetermined amount for a certain period of time in response to a trigger signal provided by a trigger circuit 9 when the power switch is turned on or the channel is switched.

The AFC voltage generating circuit is designed so as to produce a DC AFC voltage through frequency discrimination according to the "S" curve characteristic mentioned above. When the received signal frequency is at the tuning point, i.e., the detection output is at zero level, the AFC voltage generating circuit 7 provides a predetermined reference AFC voltage. The AFC voltage changes with the detuning of the received signal. The AFC voltage thus provided is applied to a variable capacitance diode which forms a part of the local oscillator circuit in the front end circuit, to control the local oscillating frequency.

Figure 2A:
FIGS. 2a–2c are diagrams showing waveforms at various parts of the AFC circuit of FIG. 1.
Figure 2B:
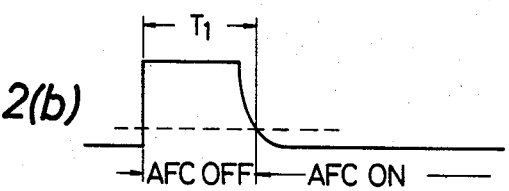

The trigger signal (FIG. 2a) from the trigger circuit 9 is applied to the circuit 8 and also to an AFC on/off control circuit 10. This circuit 10 produces a control signal as shown in FIG. 2b in response to the trigger signal so that the AFC voltage generating circuit 7 generates the aforementioned reference AFC voltage irrespective of the detection output for a predetermined period of time T after the generation of the trigger signal, in response to the control signal. The automatic frequency control (AFC) is placed in an "off" state for the predetermined period of time T. At the same time, the AFC voltage (FIG. 2c) is up shifted by a predetermined level $V_0$ for a predetermined period of time $T_2$ by the level shifting circuit 8, and is changed to the reference AFC voltage when the AFC is placed in the "on" state. A muting circuit, which produces a muting signal when the power switch is turned on or the channel is switched may be employed as the trigger circuit 9. In this case, the muting signal is used as the trigger signal.

Figure 3:
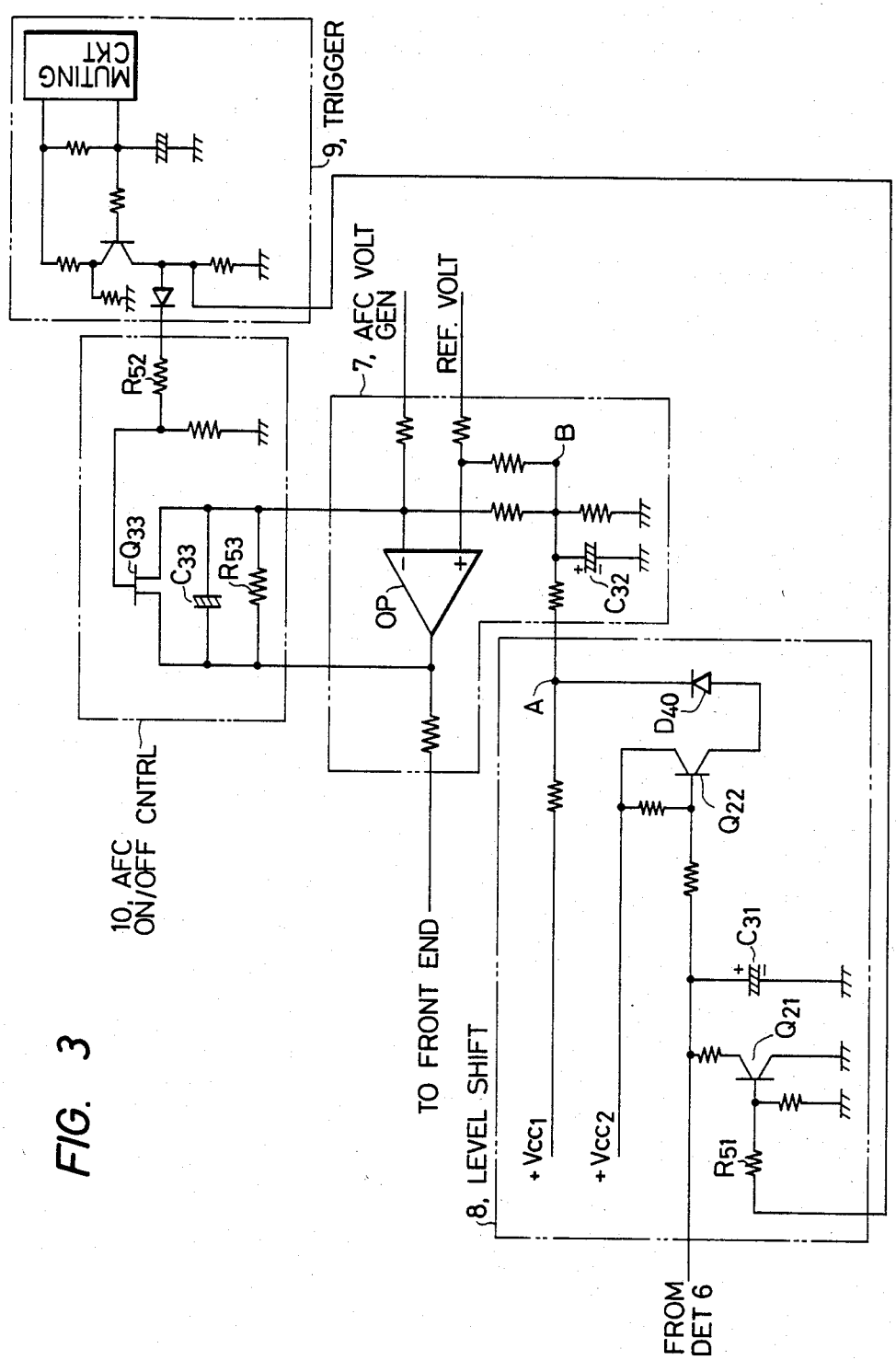
FIG. 3 is a circuit diagram illustrating portions of the circuit of FIG. 1 in more detail.

A detailed circuit diagram of essential portions of the circuit shown in FIG. 1 will now be described with reference to FIG. 3.

When the trigger signal, which is in this case the muting signal, is applied to the base of a transistor $Q_{21}$ through a resistor $R_{51}$ of the level shifting circuit 8, the transistor $Q_{21}$ is rendered ON, which in turn renders a transistor $Q_{22}$ ON. The collector current of the transistor $Q_{22}$ flows to the juncture point A at the output end of shifting circuit 8 via a diode $D_{40}$ and is shunted thereat, as a result of which the potential at point B in the AFC voltage generator 7 is increased from, for example, 7.5 V to 9.5 V, thus raising the voltage input to one side of an op-amp of the circuit 7. A capacitor $C_{31}$ is provided, and serves to effect time expansion of the output of the transistor $Q_{21}$.

Figure 2C:
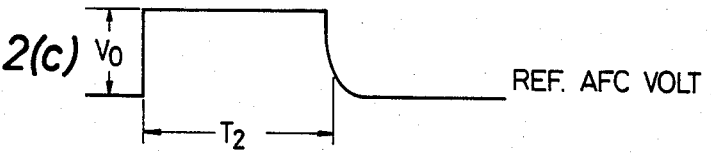

The trigger signal is also applied to the AFC on/off control circuit 10 which includes an FET $Q_{33}$, a capacitor $C_{33}$ and a resistor $R_{53}$, the latter two being connected between the source and drain of the FET $Q_{33}$. When the trigger signal is applied through a resistor $R_{52}$ to the gate of the FET $Q_{33}$, the latter is rendered ON and the output as shown in FIG. 2b is developed and applied across the operational amplifier OP of the circuit 7. Consequently, the output of the operational amplifier OP is increased from, for example, 6.5 V to 7.5 V, an exemplifying waveform of which is shown in FIG. 2c. Similarly to the capacitor $C_{31}$, a capacitor $C_{32}$ is provided for time expansion. Due to the provision of such a capacitor, automatic gain control may be carried out without fail.

With the AFC circuit thus organized, even if the tuning is shifted by 500 KMz or more towards the color carrier lower by 920 KMz than the audio carrier, the local oscillating frequency is increased by up shifting the AFC voltage with the level shift circuit 8, as a result of which the tuning is shifted higher than the tuning frequency. Accordingly, with the invention, "mislocking" of the AFC in turning on the power switch or in switching channels can be prevented, such that the AFC is satisfactory at all times.

The AFC circuit described above may be modified so that a tuning shifting direction is detected according to the detection output. Then, only when the tuning is shifted towards the color carrier, is the AFC voltage shifted in level to shift the tuning toward the audio carrier.

What is claimed is:

1. A TV receiver comprising,
    front end means for receiving a TV signal of the type including a video signal, an audio carrier, and a color carrier, said front end means including a voltage controlled local oscillator for selecting the tuning frequency of said front end means,
    IF converter means for converting the output of said front end means to an IF signal,
    means responsive to said IF signal for a detection output representative of the detuned condition of said IF signal,
    AFC voltage generator means responsive to said detected signal for generating an AFC control voltage for controlling said voltage controlled local oscillator,
    means converting said AFC control voltage to said voltage controlled local oscillator, and
    means connected to said AFC voltage generator for shifting said AFC control voltage in a direction towards an audio carrier and away from a color carrier.

2. A circuit as claimed in claim 1, wherein said shifting means comprises a level shifting circuit for varying the level of said AFC voltage for a predetermined length of time.

3. A circuit as claimed in claim 2, wherein said level shifting circuit operates in response to a trigger signal; the improvement further comprising trigger signal generating means operable in response to either the change of a channel of said tuner or the actuation of a power switch.

4. A circuit as claimed in claim 2, further including means for generating a trigger signal, said level shifting circuit operating in response to said trigger signal, and further including AFC control means operating in response to said trigger signal.

5. A circuit as claimed in claim 4, and including AFC voltage generating means receiving outputs from said level shifting circuit and said AFC control means.

6. A circuit as claimed in claim 5, wherein said AFC voltage generating means including an operational amplifier, said level shifting circuit varying a voltage applied to an input terminal of said amplifier.

7. A circuit as claimed in claim 6, wherein said AFC control means including an FET rendered conductive by said trigger signal, said FET being connected to said amplifier.

* * * * *